(12) United States Patent
Balesteros-Tolosana et al.

(10) Patent No.: US 11,352,059 B2
(45) Date of Patent: Jun. 7, 2022

(54) DEVICE FOR CONTROLLING THE TRAJECTORY OF A VEHICLE

(71) Applicant: RENAULT s.a.s., Boulogne-Billancourt (FR)

(72) Inventors: Iris Balesteros-Tolosana, Orsay (FR); Joan Davins-Valldaura, Paris (FR); Renaud Deborne, Le Chesnay (FR); Sorin Olaru, Gif sur Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 118 days.

(21) Appl. No.: 16/488,419

(22) PCT Filed: Jan. 19, 2018

(86) PCT No.: PCT/EP2018/051354
§ 371 (c)(1),
(2) Date: Aug. 23, 2019

(87) PCT Pub. No.: WO2018/157999
PCT Pub. Date: Sep. 7, 2018

(65) Prior Publication Data
US 2020/0001921 A1    Jan. 2, 2020

(30) Foreign Application Priority Data
Feb. 28, 2017 (FR) .................................. 1751593

(51) Int. Cl.
*B62D 15/02*    (2006.01)
*B60W 30/02*    (2012.01)
(Continued)

(52) U.S. Cl.
CPC .......... *B62D 15/025* (2013.01); *B60W 30/02* (2013.01); *B60W 30/0953* (2013.01);
(Continued)

(58) Field of Classification Search
CPC . B62D 15/025; B60W 30/02; B60W 30/0953; B60W 30/0956; B60W 30/12;
(Continued)

(56) References Cited

U.S. PATENT DOCUMENTS

2011/0320163 A1    12/2011  Markkula et al.
2016/0357169 A1*  12/2016  Di Cairano .......... G05B 13/048
2018/0043931 A1*   2/2018  Gupta .................... B62D 6/005

FOREIGN PATENT DOCUMENTS

CN    103879401 A  *  6/2014  ............ B60W 10/20
CN    106096525 A  * 11/2016  ......... G06K 9/00798
(Continued)

OTHER PUBLICATIONS

Machine translation of CN-106096525-A (Year: 2016).*
(Continued)

*Primary Examiner* — Nicholas Kiswanto
*Assistant Examiner* — Mohamad O El Sayah
(74) *Attorney, Agent, or Firm* — Oblon, McClelland, Maier & Neustadt, L.L.P.

(57) ABSTRACT

A device for controlling, in real time, the trajectory of an autonomous vehicle includes a control module which produces, in real time, from a state vector at each point in time, a first steering command in order to stabilize the trajectory of the vehicle relative to a vehicle path. The device includes an anticipation module which generates a variable representative of a meta-vector of deviations for each predicted position of the vehicle at points in time resulting in a given quantity at the current point in time and of the state vector
(Continued)

at the current point in time. The control module produces the first steering command by quadratic optimization of a relationship between the generated representative variable and a meta-vector of successive steering commands for each predicted position of the vehicle at points in time resulting in a given quantity at the current point in time.

13 Claims, 4 Drawing Sheets

(51) Int. Cl.
*B60W 30/095* (2012.01)
*B60W 30/12* (2020.01)
*B60W 40/072* (2012.01)
*B60W 50/00* (2006.01)

(52) U.S. Cl.
CPC ........ *B60W 30/0956* (2013.01); *B60W 30/12* (2013.01); *B60W 40/072* (2013.01); *B60W 50/0097* (2013.01); *B60W 2050/0011* (2013.01); *B60W 2050/0012* (2013.01); *B60W 2552/30* (2020.02); *B60W 2555/20* (2020.02)

(58) Field of Classification Search
CPC ........... B60W 40/072; B60W 50/0097; B60W 2555/20; B60W 2552/30; B60W 2050/0011; B60W 2050/0012
See application file for complete search history.

(56) References Cited

FOREIGN PATENT DOCUMENTS

| DE | 10 2007 008 624 A1 | 8/2008 | | |
|---|---|---|---|---|
| WO | WO 2010/053408 A1 | 5/2010 | | |
| WO | WO 2011/009009 A1 | 1/2011 | | |
| WO | WO-2011009009 A1 * | 1/2011 | ............ | G06F 30/20 |
| WO | WO 2014/006327 A1 | 1/2014 | | |
| WO | WO-2014006327 A1 * | 1/2014 | ............ | B60W 10/20 |

OTHER PUBLICATIONS

Machine translation of CN-103879401-A (Year: 2014).*
Machine translation of WO-2014006327-A1 (Year: 2014).*
International Search Report dated Apr. 13, 2018 in PCT/EP2018/051354 filed on Jan. 19, 2018.
French Preliminary Search Report dated Oct. 19, 2017 in French Application 1751593 filed on Feb. 28, 2017.

* cited by examiner

DEVICE FOR CONTROLLING THE TRAJECTORY OF A VEHICLE

The work leading to the present invention has benefited from financial support from the coal and steel research funds of the European Community by virtue of grant agreement No. 607957.

The invention relates in a general manner to a device for real-time control of vehicle trajectory. The invention relates more precisely to a lateral control device for generating in real time a vehicle turning command, in particular for an autonomous automotive vehicle or a vehicle for which driving is partially delegated, that is to say a vehicle able to move totally or partially with no human driver.

Devices or systems for real-time control of trajectory, in particular on the basis of states relating to the vehicle, are already known in numerous technical fields, including in the automotive field.

For example, patent EP1074903B1 discloses a system for following a lane with detection of marking of the lane. A direct-chain action module produces a steering driving term based on a target line position with the help of a graphics processor. The elements disclosed allow an application of this system to a rectilinear lane, or indeed one with low-curvature bends with no noticeable influence on the vehicle's dynamics, to be envisioned. An application to a lane with high-curvature bends, as might be encountered for example on mountain roads, can pose a problem of dynamic reactivity of the vehicle in order to maintain itself flexibly in the lane.

Again for example, patent U.S. Pat. No. 8,751,089B2 discloses a trajectory following control system for mobile unit. The system controls a mobile unit so as to follow a target path described by free-form curves. Though this type of system may be appropriate for piloting a robot in a space with no constraint of such a nature as to prevent the freedom of form of the curves that are appropriate for a target path, it may pose problems for an autonomous vehicle whose piloting does not consist in making it follow a target path but in maintaining it in a traffic lane, irrespective of the form of the curves that are imposed by the geometry of the lane.

The objective of the invention is to address the problems posed by the prior art, in particular in terms of effectiveness, reactivity and ease of implementation.

To attain this objective, the subject of the invention is a device for real-time control of trajectory of an autonomous vehicle comprising a control module which produces in real time on the basis of a real or estimated vector of states at each instant of following of a lane by the vehicle moving at a current speed, a first turning command to stabilize the trajectory of the vehicle with respect to the lane. The device is noteworthy in that it comprises an anticipator module which generates a quantity representative of a meta-vector of disturbances for each predicted position of the vehicle at instants succeeding in given amount the current instant and of the vector of states at the current instant, and in that the control module produces the first turning command by quadratic optimization of a relation between said representative quantity generated and a meta-vector of successive turning commands for each predicted position of the vehicle at said instants succeeding in given amount the current instant.

Particularly, said disturbances are curvatures of the lane for each predicted position of the vehicle.

Particularly also, said representative quantity comprises, for each predicted position of the vehicle at said instants succeeding in given amount the current instant, at least one product of the vector of states at the current instant by a numerical matrix modeling a dynamic relation of the vehicle and raised to a power equal to a succession rank of said predicted position.

Advantageously, said representative quantity comprises, for each predicted position of the vehicle at said instants succeeding in given amount the current instant, at least one product of factors comprising on the one hand a disturbance on the lane at the predicted position, and on the other hand a numerical matrix modeling a dynamic relation of the vehicle and raised to a power equal to a succession rank of said predicted position.

Again particularly, the device comprises an apparatus combining the properties of an optical camera and of a radar so as to provide at least one director line geometry of the lane in the form of a polynomial.

More particularly, the anticipator module comprises a sub-module for calculating curvature on the basis of the median director line geometry of the lane by means of the formula:

$$\gamma_{k+i} = \frac{y''(x)}{(1 + [y'(x)]^2)^{\frac{3}{2}}}.$$

Preferably, the relation between said representative quantity generated and the meta-vector of successive turning commands lo comprises, for each quadratic product of an anticipated state, an elementary states weighting matrix and an elementary command weighting matrix.

In particular, the elementary states weighting matrix for the last anticipated state comprises coefficients which are particular in that they are associated with a decreasing positive function of the Lyapunov type, so as to favor a convergence of the optimization.

Independently of the particular coefficients of the elementary states weighting matrix, the device comprises a module compelling all or some of the elementary commands of the meta-vector of successive turning commands to comply with constraints of type comprising at least one upper bound on the states, on the commands and/or on the measurements and/or comprising at least one lower bound on the states, on the commands and/or on the measurements.

Again advantageously, the control device comprises a module imposing constraints on all or some of the elementary commands of the meta-vector of successive turning commands, of type comprising an upper bound and a lower bound on the states, on the commands and/or on the measurements.

Particularly, the module moreover imposes constraints on the elementary commands of the meta-vector of successive turning commands, so that the last predicted state vector is in a polytope which ensures asymptotic convergence beyond the prediction horizon.

Other characteristics and advantages will become apparent on reading the description which follows, with reference to the appended drawings in which.

Figure 1:
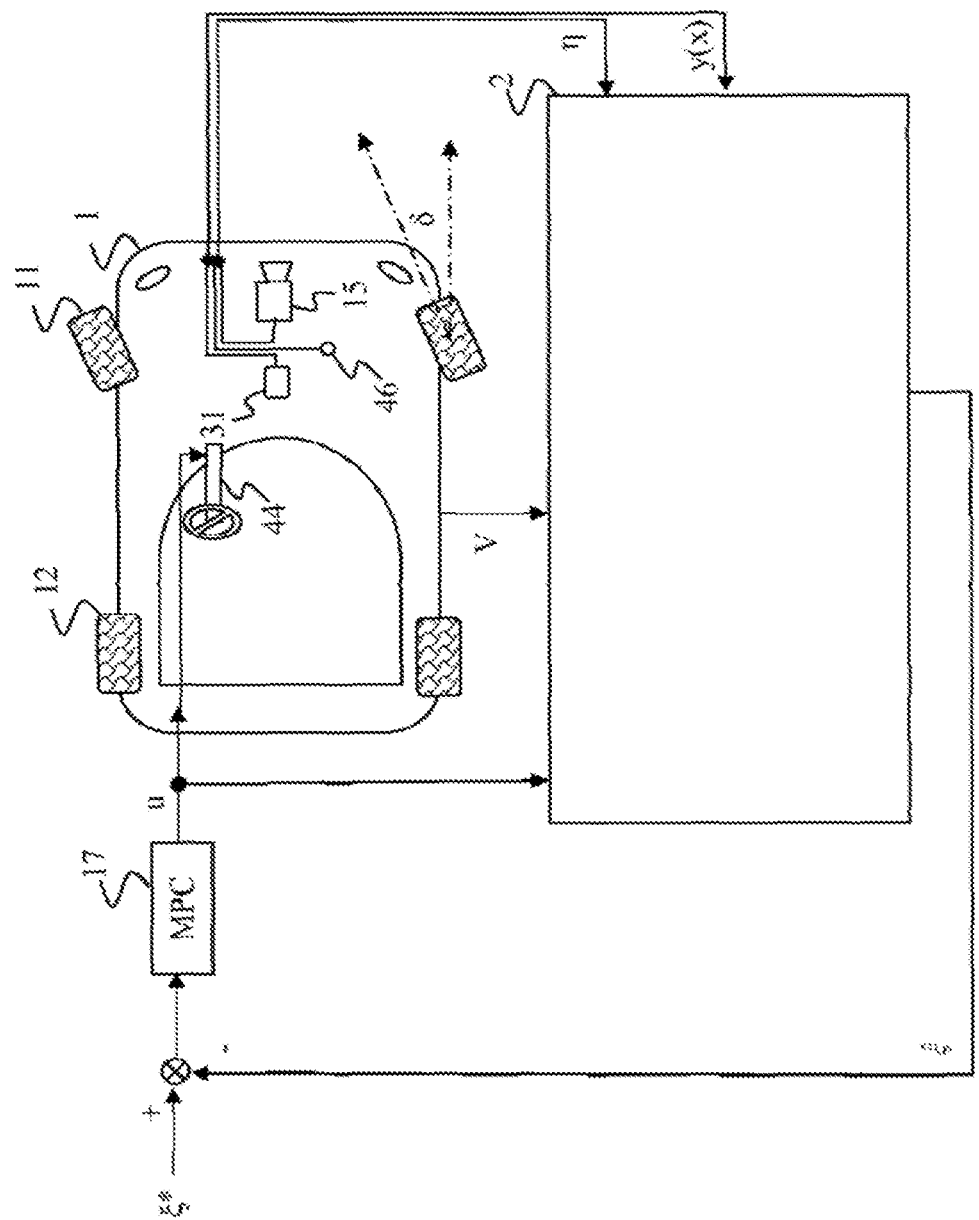
FIG. 1 represents a vehicle to which the invention is applicable.

With reference to FIG. 1, an automotive vehicle 1, with traction or propulsion driven by a thermal engine and/or an electric motor (not represented in the figures), comprises four wheels comprising two front wheels 11 which are preferably the steerable wheels, and two rear wheels 12. Each wheel is optionally equipped respectively with a sensor of instantaneous angular speed, for example of pulse generator type, making it possible to ascertain a current speed v of the vehicle, in particular a longitudinal current speed v of the vehicle.

The vehicle 1 comprises a steering column 44 whose top part is optionally equipped with a steering wheel, the latter possibly becoming unnecessary for a purely autonomous vehicle, and whose bottom part acts on a steering member known per se which makes it possible to direct the front wheels. The steering column 44 is equipped with an actuator piloted by a command signal u. The steering member is equipped with a sensor 46 at the base of the steering column or at any other location, for example with a rack acting on the front wheels, to measure an actual turning angle δ of the front wheels of the vehicle. The sensor 46 is for example a sensor of torque whose value is readily converted into turning angle.

The vehicle 1 also comprises a sensor 31 of the yaw rate $\dot{\psi}=\partial\Psi/\partial t$ of the vehicle, that is to say of the rate of rotation of the vehicle about its center of gravity along an axis perpendicular to the plane of the carriageway on which the vehicle is traveling. The sensor 31 is for example a gyrometer situated very close to the center of gravity (CoG) of the vehicle. An apparatus 15 of combined radar and camera type, that is to say combining the properties of an optical camera and of a radar, makes it possible to measure coordinates of objects $Y_{CAM}$ which are transverse to a median axis of the vehicle and $X_{CAM}$ along the median axis forward of the vehicle 1.

As known moreover to the supplier of the apparatus 15, fusing the optical measurements and radar measurements makes it possible to detect, for each marking point on the carriageway, the distance x of this point with respect to the front face of the apparatus 15 along its viewing axis and the distance y of this same point with respect to the viewing axis. An image processing, outside of the framework of the present invention, allows the apparatus 15 to provide a geometry y(x) [vehicle-line lateral distance] of at least one director line of the traffic lane of the vehicle in the form of a polynomial, for example of the demarcation line on the left and of the demarcation line on the right of the lane or of the median line of the lane at the center of the two demarcation lines. For a considered director line, the polynomial has for example the following form:

$$y = p_{3(t)}x^3 + p_{2(t)}x^2 + p_{1(t)}x + p_{0(t)}.$$

where for example the coefficient $p_{0(t)}$ corresponds to the vehicle-line lateral distance at the center of gravity.

The vehicle 1 is equipped in a manner known per se with an on-board computer (not represented as such) making it possible to control and to command various members of the vehicle. The computer can receive through connections, in particular via a CAN, Lin or automobile Ethernet bus or other on-board network, information originating from the sensors of longitudinal speed, from the sensor 31 of yaw rate, from the sensor 46 of the turning angle δ and from the apparatus 15. The on-board computer can also control the steering column 44 by communicating a command signal u to it. The on-board computer can host furthermore a controller device 17 to generate the command signal u so as to render a physical state vector of the vehicle compliant with a setpoint state vector ξ* which ensures that the vehicle 1 follows a desired trajectory. The physical states of the vehicle depend on numerous more or less well mastered physical data which act on its dynamic behavior. It is possible to determine in real time the vector $\xi_k$ of physical states at each instant k when the vehicle is equipped with at least one sensor making it possible to measure each physical state. When the vehicle does not have a sensor for each controlled state, the on-board computer hosts an observer device 2 to generate in real time a vector of estimated states $\hat{\xi}$ of trajectory following of the vehicle 1 moving at the current speed v, on the basis of the command u and of a current measurement vector η correlated with the vector of physical states ξ of trajectory following of the vehicle 1, corresponding to the lateral dynamics of the vehicle, which are measurable and non-measurable per se, as explained now with reference to FIG. 2.

Figure 2:
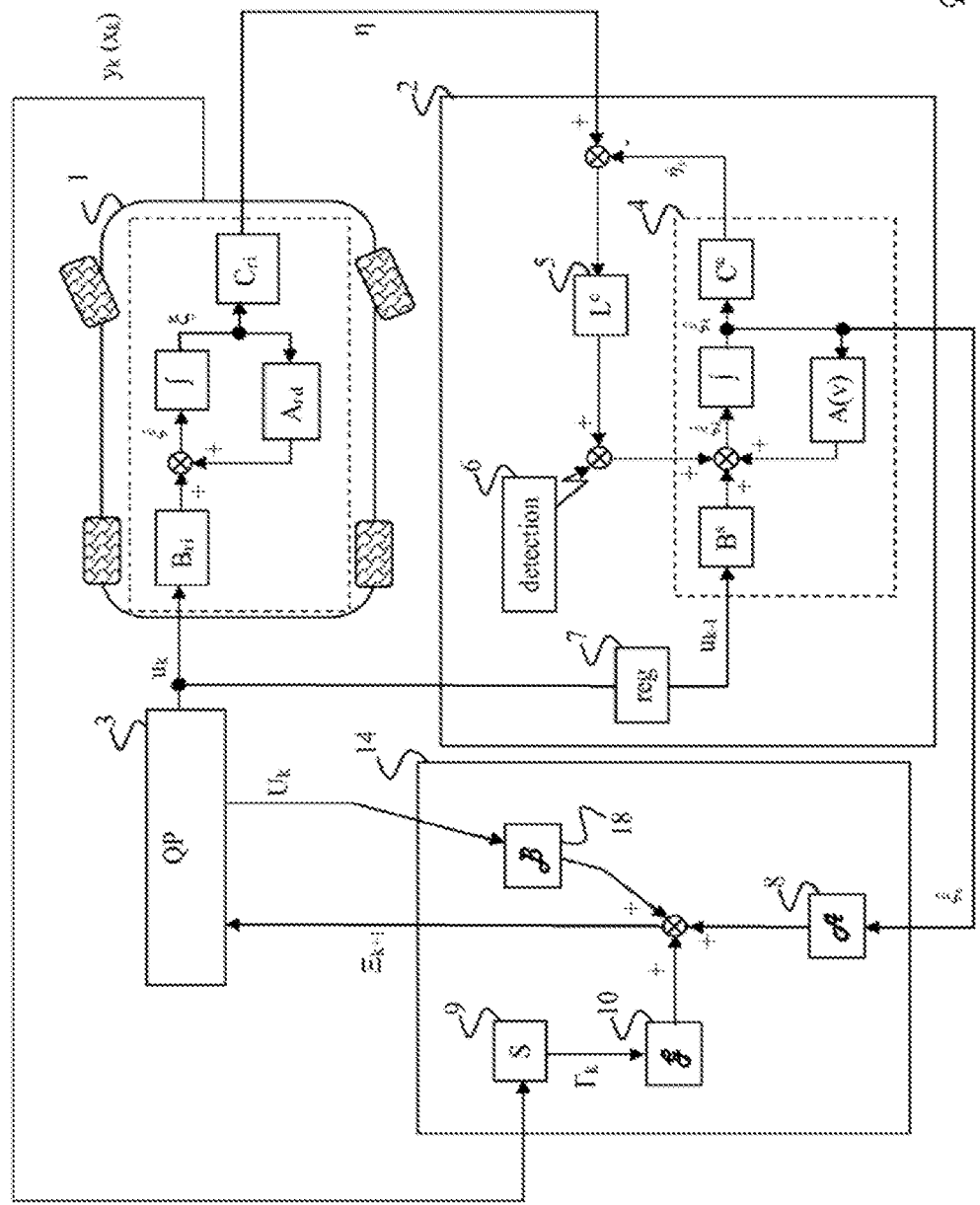
FIG. 2 is a diagram of first mode of implementation of the device in accordance with the invention.

In the embodiment illustrated by FIG. 2, an actual vector of physical states ξ of the vehicle 1 is considered, comprising at least two state variables, among which may be cited for example in an arbitrary pre-established order but preferentially in a definitive manner for a given vehicle, an actual yaw rate $\dot{\psi}_{ef}=\partial\Psi/\partial t$ of the vehicle, an angle $\Psi_{rel,ef}$ of actual relative deviation of the vehicle from its ideal trajectory and an actual lateral rate $\dot{Y}_{CoG,ef}=\partial Y_{CoG}/\partial t$ of divergence of the center of gravity of the vehicle with respect to its ideal trajectory. The angle $\Psi_{rel,ef}$ of actual relative deviation is the angle that the median axis of the vehicle actually makes with the tangent to the ideal trajectory at each instant considered. The actual lateral rate $\dot{Y}_{CoG,ef}=\partial Y_{CoG}/\partial t$ of divergence of the center of gravity is the rate at which the center of gravity of the vehicle is actually diverging from the ideal trajectory, perpendicular to the tangent to the ideal trajectory at the instant considered. By ideal trajectory of the vehicle is meant the median line of the traffic lane on which it is desired that the vehicle progress. The actual state vector ξ of the vehicle 1 can comprise other scalar coordinates such as for example the actual divergence $Y_{cog,ef}$ of the center of gravity of the vehicle with respect to its ideal trajectory, the actual variation $\dot{\delta}_{ef}=\partial\delta/\partial t$ of angle of turning of the wheels of the vehicle over time, and the actual turning angle $\delta_{ef}$ of the wheels.

The state variables can have a meaning independent of the mode in which the vehicle is operating or a meaning specific to the mode in which the vehicle is operating. The yaw rate, which is the rate at which the vehicle pivots about an axis perpendicular to the plane of the to carriageway, is independent of the mode of operation. The same holds for the actual variation $\dot{\delta}_{ef}=\partial\delta/\partial t$ of angle of turning of the wheels of the vehicle over time, and for the actual turning angle $\delta_{ef}$ of the wheels since these variables are related to the state of the wheels themselves with respect to the chassis of the servocontrolled vehicle. On the other hand the actual divergence $Y_{cog,ef}$ of the center of gravity of the servocontrolled vehicle with respect to its ideal trajectory, is the lateral deviation between the median line or director line of the lane and the center of gravity of the servocontrolled vehicle on the axis perpendicular to the axis of the vehicle in LCA (Lane Centering Assistance) mode. The actual lateral rate $\dot{Y}_{CoG,ef}=\partial Y_{CoG}/\partial t$ of divergence of the center of gravity is the temporal variation of the previous variable.

The actual state vector ξ of the vehicle 1 can also comprise scalar coordinates which differ in number and/or in nature according to the mode of operation of the vehicle.

Returning to the illustrative example hereinabove, an optional state variable $\int -Y_{CoG}dt$ can represent a temporal integral of the deviations of the center of gravity of the servocontrolled vehicle with respect to the point on which it ought to be of the director line of the lane. In fact this state variable does not correspond to any real physical state, it is rather an artefact inherited from the closed loop servocontrols of PID type in which the integral component of the gain makes it possible to obtain a non-zero output of the amplifier for a zero error applied to its input, the technical effect of which is to impose a zero error, here on the actual divergence $Y_{cog,ef}$ of the center of gravity of the vehicle with respect to the median line of the traffic lane.

To this actual state vector $\xi$ of the vehicle 1 there corresponds a reference state vector $\xi^*$ that one desires be attained at each instant of running of the servocontrolled vehicle. For example to the coordinates $\dot{\psi}_{ef}$, $\Psi_{rel,ef}$, $\dot{Y}_{CoG,ef}$, $Y_{CoG,ef}$ of the state vector $\xi$ there correspond coordinates $\dot{\psi}_{ref}$, $\Psi_{ref}$, $\dot{Y}_{CoG,ref}$, $Y_{CoG,ref}$ of the state vector $\xi^*$ of zero values since an absence of deviation of the actual trajectory of the servocontrolled vehicle from its ideal trajectory, for example the center of the lane, is of course desired.

The observer device 2 is particularly useful when the actual state vector $\xi$ of the vehicle 1 is unknown because the internal state of the servocontrolled vehicle, governed by the natural laws of physics, comprises all or some of the inaccessible and non-measurable state variables.

It is recalled that the known laws of physics say that a vector $\dot{\xi}$ of temporal evolution of the state vector $\xi$ of the physical system consisting of the vehicle 1 is related to the state vector $\xi$ by a dynamic relation $A_{rd}$ which, in the absence of exterior disturbance, tends generally to lead the state of the vehicle to a stable final state. The stable final state of the vehicle not necessarily being that which it is sought to attain, the aim of the invention is to produce a command u which permanently disturbs the system so as to maintain the actual state vector $\xi$ in accordance with the reference state vector $\xi^*$. The disturbance thus caused on the temporal evolution vector $\dot{\xi}$ is related to the command u by an invasive relation $B_{ri}$, likewise governed by the laws of physics. Other exterior disturbances, of globally unknown nature, also acting on the physical system consisting of the vehicle 1, a negative-feedback servocontrol mechanism is employed, in which the aim of the observer device 2 is to generate in real time, at each current instant indexed k, an estimated state vector $\hat{\xi}_k$ representing the actual state vector $\xi$ as faithfully as possible.

To attain its aim, the observer device 2 comprises a module 4 which models the physical system consisting of the vehicle 1, in particular in terms of trajectory following. The module 4 comprises a calculated numerical matrix A(v), calculated in particular as a function of the speed v of the vehicle, and modeling the dynamic relation $A_{rd}$ and a numerical matrix $B^s$ representative of the invasive relation $B_{ri}$.

The numerical matrix A(v) can have various forms, each suitable for a mode of operation of the vehicle. The form of the numerical matrix A(v) is essentially related to the definition of the state vector $\xi$ of the vehicle 1 and to the dynamic relation applied. The exemplary form set forth hereinbelow is based on the bicycle model well known in the technical field considered, as illustrated by numerous prior documents such as FR2925005 or WO2012084465.

The example considered here is that of the LCA mode, for which for example to the state vector $$\xi = \begin{pmatrix} \dot{\psi} \\ \psi_{rel} \\ \dot{Y}_{CoG} \\ Y_{CoG} \\ \dot{\delta} \\ \delta \\ \int -Y_{CoG}dt \end{pmatrix}$$

there corresponds the numerical matrix A(v) given by the following formula 101:

$$A(v) = \begin{pmatrix} a_{11}(v) & a_{12} & a_{13}(v) & 0 & 0 & a_{16} & 0 \\ 1 & 0 & 0 & 0 & 0 & 0 & 0 \\ a_{31}(v) & a_{32} & a_{33}(v) & 0 & 0 & a_{36} & 0 \\ 0 & 0 & 1 & 0 & 0 & 0 & 0 \\ 0 & 0 & 0 & 0 & a_{55} & a_{56} & 0 \\ 0 & 0 & 0 & 0 & 1 & 0 & 0 \\ 0 & 0 & 0 & -1 & 0 & 0 & 0 \end{pmatrix}$$

In which certain coefficients are variable and others are constant in the course of one and the same running sequence.

The variable coefficients are essentially those which depend on a speed, in particular on the longitudinal speed v of the vehicle. To adapt to the speed variations, the variable coefficients are recalculated in real time by reading on the one hand the speed v of the vehicle 1, in particular the longitudinal speed v generally accessible on the on-board network (CAN, LIN or automobile Ethernet Bus or other type) and on the other hand parameters generally accessible in memory, by means of the formulae 102 to 105 in the following order:

$$a_{11}(v) = \frac{-(c_r l_r^2 + c_f l_f^2)}{I_z v}$$

$$a_{13}(v) = \frac{(c_r l_r - c_f l_f)}{I_z v}$$

$$a_{31}(v) = \frac{(c_r l_r - c_f l_f)}{Mv}$$

$$a_{33}(v) = \frac{-(c_r + c_f)}{Mv}$$

in which the parameters $c_r$, $c_f$, $l_r$, $l_f$, $I_z$, M each quantify in a manner known per se elsewhere (cf. filings FR1255068, FR1255188, or FR12563339) respectively the drift stiffness of the rear wheels 12 and the drift stiffness of the front wheels 11 obtained from the supplier of the wheel tires or by means of on-circuit running trials, the distance of the axis of the rear wheels and the distance of the axis of the front wheels with respect to the center of gravity CoG of the vehicle 1, the moment of inertia of the vehicle about the perpendicular to the plane passing through the axes of the front and rear wheels, and finally the mass of the vehicle.

The coefficients which are constant in the course of a running sequence can be precalculated during the design of the vehicle and then stored in on-board computer memory.

They are determined by the formulae 106 to 111 in the following order:

$$a_{12} = \frac{(c_f l_f - c_r l_r)}{I_z}$$

$$a_{16} = \frac{c_f l_f}{I_z}$$

$$a_{32} = \frac{(c_f + c_r)}{M}$$

$$a_{36} = \frac{c_f}{M}$$

$$a_{55} = -2\mu\omega$$

$$a_{56} = -\omega^2$$

In which on the one hand $\mu$ and $\omega$ designate respectively a damping coefficient and a natural angular frequency of the transfer function of the command for turning the wheels which models the dynamics of the steering column.

The coefficients which are constant in the course of a running sequence can also be calculated each time the vehicle is started up so as to take account of a mass M and of a moment of inertia $I_z$ which may be different at each startup as a function of the number of passengers and of the loading. The variations of these parameters, caused for example by the consumption of fuel or a passenger alighting from the vehicle while en route, are generally quite insignificant.

The unitary coefficients exist on the row corresponding to the time derivative of a state variable which is itself a state variable of rank equal to that of the column of the matrix.

The other coefficients are zero, with the exception of the last column where they are all zero and of the last row where only the median coefficient is not zero but equal to −1 so as to artificially reproduce a PID type conventional linear servocontrol negative feedback.

The number of columns of the matrix is equal to the number of coordinates of the state vector and the number of rows is equal to the number of coordinates of the state temporal variation vector, that is to say equal to the number of rows. It will be understood that the numerical matrix A(v) can comprise different numbers of rows and columns from those of the examples hereinabove, in particular a greater number if the need makes itself felt to consider an additional state variable or lower if a state variable is considered unnecessary.

The numerical matrix $B^s$ representative of the invasive relation $B_{ri}$ is suitable for the mode of command of the vehicle and of taking into account exterior factors. The form of the numerical matrix $B^s$ is essentially related to the state vector $\xi$, the number of coordinates of which fixes the number of rows and to the interactions with the system, the amount of which fixes the number of columns. The main example of form set forth hereinbelow corresponds to the example set forth hereinabove.

For the LCA mode, the numerical matrix $B^s$ is given by the following formula 112:

$$B^s = \begin{pmatrix} 0 \\ 0 \\ 0 \\ 0 \\ b_{51} \\ 0 \\ 0 \end{pmatrix}$$

in which the single column is associated here with the first disturbance which is the turning command u. The coefficient $b_{51}$ is here again equal to the square of the natural angular frequency $\omega$ of the transfer function of the wheels turning command.

To model the vehicle 1, the module 4 receives the command $u_{k-1}$ at each discrete sampling instant k so as to generate the estimated state vector $\hat{\xi}_k$ by reproducing the equations of dynamics by means of the numerical matrices A(v) and $B^s$ intervening in formulae 113 and 114 respectively:

$$\hat{\xi} = \int \dot{\hat{\xi}} dt$$

$$\dot{\hat{\xi}} = A(v)\hat{\xi} + B^s u_{k-1}$$

Several conditions ought to be satisfied in order that the estimated state vector $\hat{\xi}$ faithfully reproduces the physical state vector $\xi$ of the vehicle.

In formula 113 which is an integral with respect to time, it would be necessary that, at an initial instant, the estimated state vector $\hat{\xi}$ be equal to the physical state vector $\xi$ of the vehicle.

In formula 114, it would be necessary that the numerical matrices A(v) and $B^s$ perfectly model the dynamic relation $A_{rd}$ and the invasive relation $B_{ri}$ which actually impact the vehicle.

It is clearly appreciated that these conditions cannot be satisfied for numerous reasons such as the accuracy of the parameters which qualify the vehicle although they are subject to manufacturing dispersions and to aging from usage, the unforeseen disturbances and many other known or unknown reasons except of course by equipping the vehicle with sensors in sufficient amount to measure each real state of the vehicle.

To reduce the deviation between the estimated state vector $\hat{\xi}$ which is calculated, and the physical state vector $\xi$ of the vehicle at the same instant k which is unknown, the observer 2 receives, on a second input, a vector $\eta$ of current measurements which are representative of the state of the vehicle. The vector $\eta$ of current measurements is correlated with the physical state vector $\xi$ through an instrumental relation $C_{ri}$ which depends on the configuration of the state vector, that is to say on the mode of operation of the vehicle, and the measurement sensors with which the vehicle is equipped.

Returning to the example for the LCA mode of operation, the vector $\eta$ of current measurement comprises five components which are the yaw rate $\dot{\psi}$ such as is measured by the sensor 31, the angle $\Psi_{rel}$ of relative deviation such as is measured by the apparatus 15 sighting a median line of the traffic lane, the radial divergence $Y_{CoG}$ of the center of gravity with respect to the median line of the traffic lane such that this divergence is obtained on the basis of the apparatus 15 or of the on-board computer, the angle δ of turning of the wheels 11 such as is measured by the sensor 46 and the accumulation $\int Y_{CoG} dt$ over time of the opposite of the divergence $Y_{CoG}$ of the center of gravity provided by the apparatus 15. By regarding the duration dt as the sampling period for each instant k, this pseudo measurement is obtained through the very simple formula 115:

$$[\int Y_{CoG} dt]_k = [\int Y_{CoG} dt]_{k-1} + [Y_{CoG}]_k \text{ initialized to zero.}$$

The instrumental relation $C_{ri}$ is approximated in the module 4 by a numerical matrix $C^c$ so as to generate a measurement vector $\hat{\eta}_k$ estimated on the basis of the state vector $\hat{\xi}_k$ estimated for the mode of operation considered.

In the LCA mode of operation, for example to the vector of measurements $$\eta = \begin{pmatrix} \dot{\psi} \\ \psi_{rel} \\ Y_{CoG} \\ \delta \\ \int -Y_{CoG} dt \end{pmatrix}$$

there corresponds the numerical matrix $C^c$ given preferably by the following formula 116:

$$C^C = \begin{bmatrix} 1 & 0 & 0 & 0 & 0 & 0 & 0 \\ 0 & 1 & 0 & 0 & 0 & 0 & 0 \\ 0 & 0 & 0 & 1 & 0 & 0 & 0 \\ 0 & 0 & 0 & 0 & 0 & 1 & 0 \\ 0 & 0 & 0 & 0 & 0 & 0 & 1 \end{bmatrix}$$

in which the non-zero coefficients $c_{11}$, $c_{22}$, $c_{34}$, $c_{46}$, $c_{57}$, are constant and unitary since the measurements considered form part of the state variables in the particular case of the illustrative example.

The module 4 then calculates the estimated measurement vector $\hat{\eta}_k$ by multiplying in real time the estimated state vector $\hat{\xi}_k$ by the matrix $C^c$ at each instant of index k.

Whatever the mode of operation of the vehicle, an estimation gain (sometimes dubbed Kalman gain) module 5 has the function of correcting the time derivative $\dot{\hat{\xi}}$ of the state vector so that the measurement vector estimated $\hat{\eta}$ on the basis of the estimated state vector $\hat{\xi}$ coincides under steady conditions with the real measurement vector $\eta$, so that the estimated state vector $\hat{\xi}$ thus coincides with the trajectory following physical state vector $\xi$ of the vehicle 1. Accordingly, the module 5 adjusts in real time the temporal variation $\dot{\hat{\xi}}$ of estimated state vector $\hat{\xi}$ so as to reduce a stabilization deviation between the current measurement vector $\eta$ and the estimated measurement vector $\hat{\eta}$ by multiplying the stabilization deviation by a correction gain matrix $L^c$.

The stabilization deviation between the two measurement vectors $\eta$ and $\hat{\eta}$ being a vector of dimension equal to that of the measurement vectors and the correction to be added to the temporal variation $\dot{\hat{\xi}}$ of the estimated state vector being a vector of dimension equal to that of the state vectors, the matrix $L^c$ comprises a number of rows which is equal to the number of coordinates of the state vector and a number of columns which is equal to the number of coordinates of the measurement vector.

Thus, the observer device 2 can behave as a Kalman observer defined by the equation of formula 117:

$$\dot{\hat{\xi}} = A^c \hat{\xi} + B^s u_{st} + L^c (\eta - C^c \hat{\xi})$$

The matrix $L^c$ corresponds to the matrix of the gains of the Kalman observer, without it appearing to be necessary here to develop in greater detail the obtainment thereof which is known elsewhere.

The Kalman observer described hereinabove is described essentially by way of illustration for a better understanding of the implementation of the invention but other observers may be used such as for example high-gain observers, sliding mode observers, observers of extended Kalman type, Luenberger observers or other Bayesian type filters for which the person skilled in the art should effortlessly know how to carry across the teaching lavished here.

Figure 3:
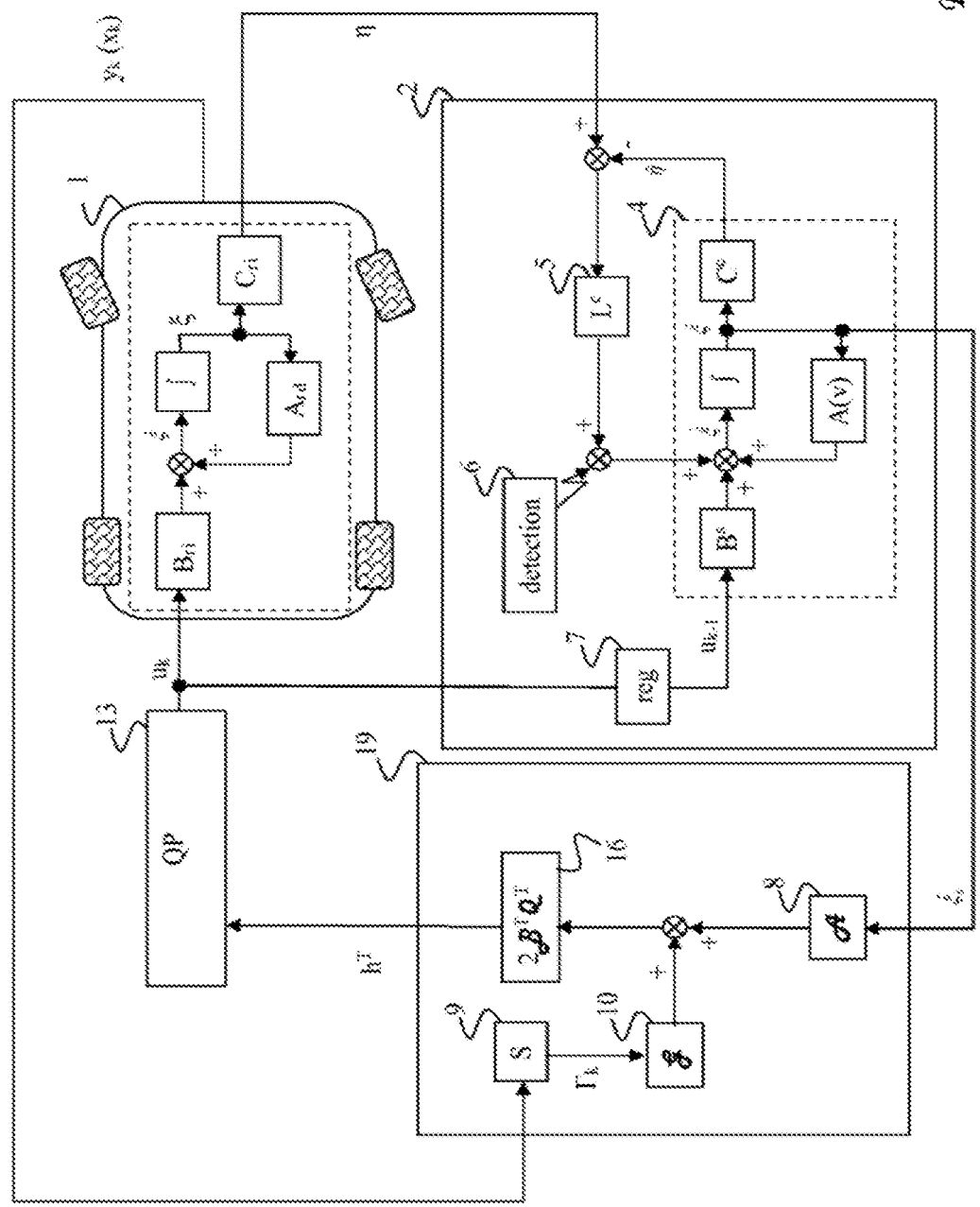
FIG. 3 is a diagram of second mode of implementation of the device in accordance with the invention.

The estimated state vector $\hat{\xi}$ thus generated by the module 2 is communicated to a module 14 in the didactic embodiment illustrated by FIG. 2 or to a module 19 in the preferred embodiment illustrated by FIG. 3. The module 14 and the module 19 have in common that they generate a vector quantity which takes into account the estimated state vector $\hat{\xi}$ at the instant k and the curvatures $\gamma_{k+i}$ at the vehicle's expected locations of the lane at each future instant k+i of displacement of the vehicle, i varying from 1 to N. The integer number N thus designates the amount of forthcoming samplings which, generally performed with a constant period, establishes a time window dubbed the "prediction horizon" in which the prediction is performed. Its value is parametrizable so as to be able to adjust it in a trial-vehicle fine tuning phase, so as to be carried over thereafter to mass-production vehicles. The number N is generally chosen so as to obtain a time window of the order of 1 to 5 seconds, typically corresponding to a safety distance before collision with an obstacle. On the basis of this block, a discretization of the matrices of the system is effected, this discretization can be effected by Taylor-series-based Euler discretization schemes or exact-discretization schemes, for example.

Of course, if one has a vector $\xi_k$ of real states of the vehicle with respect to the lane at the instant k, it is the vector $\xi_k$ of real states which is communicated to the module 14 in the didactic embodiment illustrated by FIG. 2 or to the module 19 in the preferred embodiment illustrated by FIG. 3. The module 2 is then no longer useful.

The description now explains how the anticipator module 14 or 19 generates a quantity representative of the curvatures of the lane for each predicted position of succession rank i of the vehicle 1 at instants succeeding in given amount N the current instant k and of the estimated state vector $\hat{\xi}_k$ at the current instant k.

The vector quantity generated by the module 14 is a meta state vector $\Xi_{k+1} = (\bar{\xi}_{k+i})_{i=1}^{N}$ comprising the N estimated states predicted subsequent to the estimated state $\hat{\xi}_k$ or to the real state $\xi_k$. Considering n the number of elementary states of the system, that is to say the number of coordinates of the estimated state vector $\hat{\xi}_k$ or real state vector $\xi_k$ and N the number of anticipated lane curvatures ahead of the vehicle, the vector $\Xi_{k+1} = (\bar{\xi}_{k+i})_{i=1}^{N}$ comprises N times n estimated components to be predicted at the future instants.

It can be defined in the following manner:

For the instant k+1, no measurement vector $\eta_{k+1}$ is yet available at the instant k, but if the curvature of the lane $\gamma_k$ which acts as a disturbance is known, it is possible to write formula 118:

$$\bar{\xi}_{k+1} = A(v)\hat{\xi}_k + B^s u_k + G(v)\gamma_k$$

where G(v) is a matrix with one column and n rows, each corresponding to a state coordinate of the state vector $\xi_k$.

In the column of the matrix G(v), only two coefficients $g_2$ and $g_3$ are non-zero considering that the curvature $\gamma_k$ acts directly on the angle $\Psi_{rel,ef}$ of actual relative deviation of the vehicle from its ideal trajectory and on the actual lateral rate $\dot{Y}_{CoG,ef} = \partial Y_{CoG}/\partial t$ of divergence of the center of gravity of the vehicle with respect to its ideal trajectory. The coefficient $g_2$ is equal to the opposite of the longitudinal speed v of vehicle and the coefficient $g_3$ is equal to the opposite of the square of the longitudinal speed v of vehicle.

By extrapolation if the following curvatures $\gamma_{k+i}$ of the lane are known, the coordinates of the vector $\Xi_{k+1} = (\xi_{k+i})_{i=1}^N$ are then expressed as a function of those of the vector of index k in the following manner by varying i from 1 to N:

For i=1:

$$\xi_{k+1} = A(v)\xi_k + B^s u_k + G(v)\gamma_k$$

For i=2:

$$\xi_{k+2} = A(v)\xi_{k+1} + B^s u_{k+1} + G(v)\gamma_{k+1} = A(v)(A(v)\xi_k + B^s u_k + G(v)\gamma_k) + B^s u_{k+1} + G(v)\gamma_{k+1}$$

$$\xi_{k+i} = A(v)^i \xi_k + A(v) \cdot B^s u_k + A(v) \cdot G(v)\gamma_k + B u_{k-1+i} + G \gamma_{k-1+i}$$

For i=3:

$$\xi_{k+i} = A(v)^i \xi_k + A(v)^{i-1}(B^s u_k + G(v)\gamma_k) + A(v)^{i-2}(B^s u_{k-2+i} + G(v)\gamma_{k-2+i}) + B u_{k-3+i} + G\gamma_{k-3+i}$$

We see the appearance of a formula 119 of the type:

$$\hat{\xi}_{k+i} = A(v)^i \hat{\xi}_k + \sum_{j=1}^{i} A(v)^{i-j} \cdot B^s u_{k+i-j} + \sum_{j=1}^{i} A(v)^{i-j} \cdot G(v)\gamma_{k+i-j}$$

or in compact matrix form by defining the following meta-matrices and meta-vectors:

$\mathcal{A} = [A(v)^i]_{i=1}^N$ is a meta-matrix with N times n rows and n columns. Stated otherwise, the first n rows of the meta-matrix $\mathcal{A}$ retranscribe the matrix $A(v)$ and the last n rows of the meta-matrix $\mathcal{A}$ retranscribe the matrix $A(v)^N$. The intermediate rows $n(i-1)+1$ to ni of the meta-matrix $\mathcal{A}$ for their part retranscribe the matrix $A(v)^i$. This comes down to considering the speed v on which the calculated matrix $A(v)$ depends at each instant to be constant over the N anticipated instants of the prediction horizon. The value of the speed v will of course be refreshed at the following iteration of the calculation. If the calculation means so allow, it is also possible to predict a speed variation as a function of knowledge of acceleration or of deceleration.

$$\mathcal{B} [A(v)^{i-j} \cdot B^s]_{\substack{i=1 \\ j \leq i}}^{N \times N}$$

is a meta-matrix with N times n rows and in the most general manner N times $n_c$ columns, where $n_c$ is the number of commands of the system. In the case of the LCA system with the turning angle command as sole command, $n_c=1$. Stated otherwise, the first n rows of the first column of the meta-matrix $\mathcal{B}$ retranscribe the matrix product $A(v)^0 \cdot B^s$, that is to say the matrix $B^s$, and the first n rows of the following columns have zero coefficients, and likewise the last n rows of the last column of the meta-matrix $\mathcal{B}$ retranscribe the matrix product $A(v)^0 \cdot B^s$. The intermediate rows $n(i-1)+1$ to $n(i-1)+n$ of a $j^{th}$ column of the meta-matrix $\mathcal{B}$, j lying between 1 and i, for their part retranscribe the matrix product $A(v)^{i-j} \cdot B^s$, the same rows in the following columns having zero coefficients.

$U_k = (u_{k+i})_{i=1}^N$ is a meta-vector with N rows which lists the following N commands envisaged to be applied for a state evolution of the vehicle in accordance with that estimable on the basis of the current state.

$$\mathcal{G} = [A(v)^{i-j} \cdot G]_{\substack{i=1 \\ j \leq i}}^{N \times N}$$

is a meta-matrix with N times n rows and N columns. Stated otherwise, the first n rows of the first column of the meta-matrix $\mathcal{G}$ retranscribe the matrix product $A(v)^0 \cdot G(v)$, that is to say the matrix $G(v)$, and the first n rows of the following columns have zero coefficients, and likewise the last n rows of the last column of the meta-matrix $\mathcal{G}$ retranscribe the matrix product $A(v)^0 \cdot G(v)$. The intermediate rows $n(i-1)+1$ to $n(i-1)+n$ of a $j^{th}$ column of the meta-matrix $\mathcal{G}$, j lying between 1 and i, for their part retranscribe the matrix product $A(v)^{i-j} \cdot G(v)$, the same rows in the following columns having zero coefficients.

$\Gamma_k = (\gamma_{k+i})_{i=1}^N$ is a meta-vector with N rows which lists the curvatures of the lane or stated otherwise of ideal trajectory of the vehicle over a prediction horizon of N future sampling instants. To obtain the meta-vector $\Gamma_k$, the module 14 comprises a calculation sub-module 9 which can generate the meta-vector $\Gamma_k$ of anticipated curvatures of the lane in various ways.

In a first mode of prediction in which the anticipated curvatures of the lane are those imposed on the vehicle by the carriageway for the k future instants assuming a constant speed of the vehicle, the calculation sub-module 9 receives the polynomial $y_k(x_k)$ given at the current instant k of processing by the apparatus 15 described hereinabove with reference to FIG. 1. The calculation sub-module 9 then receives from the apparatus 15 the polynomial $y_k(x_k)$ which gives the geometry of the director line of the traffic lane for each point at the distance $x_{k+1}$, $x_{k+i}$, $x_{k+N}$, ahead of the vehicle, generally in the form of a vector $(p_0, p_1, p_2, p_3)^T$ whose coordinates correspond to the coefficients of the polynomial. The calculation sub-module 9 then calculates the curvature $\gamma_{k+i}$ by means of formula 120 hereinbelow:

$$\gamma_{k+i} = \frac{y''(x_{k+i})}{(1 + [y'(x_{k+i})]^2)^{3/2}}$$

where the distance of the future position of the vehicle $x_{k+i}$ ahead of the vehicle is itself calculable in real time on the basis of the speed v, for example as a first approximation by means of formula 121 hereinbelow:

$$x_{k+i} = i \cdot v \cdot Ts$$

where Ts is the numerical processing and/or sampling period. Other more elaborate formulae can easily be envisioned by the person skilled in the art, for example taking account of a projection of the trajectory on the straight line ahead of the vehicle.

If the polynomial is of degree 3 as mentioned hereinabove, the first derivative is given in a simple manner by formula 122 hereinbelow:

$$y'(x) = 3p_3 x^2 + 2p_2 x + p_1$$

Likewise, the second derivative is given by the simple formula:

$$y''(x) = 6p_3 x + 2p_2$$

Each curvature $\gamma_{k+i}$ can thus easily be calculated in real time by means of formula 123 hereinbelow:

$$\gamma_{k+i} = \frac{6p_3 x_{k+i} + 2p_2}{\left(1 + [3p_3 x_{k+i}^2 + 2p_2 x_{k+i} + p_1]^2\right)^{3/2}}$$

In the first mode of prediction in which the anticipated curvatures of the lane are those imposed on the vehicle by the carriageway for the k future instants, an alternative implementation consists in arranging the calculation sub-module 9 so as to access a sufficiently accurate road system map, stored in on-board memory or downloaded in real time, combined with a high-precision satellite positioning system S, for example of GALILEO type, so as to deduce the traffic lane curvatures on the basis of said map and of the positioning of the vehicle.

In a second mode of prediction in which the predicted trajectory curvatures are those generated by a system for trajectory calculation in autonomous mode, for example so as to change lane or direction, to avoid an obstacle or for any other reason, the calculation sub-module 9 receives an equation descriptive of the ideal trajectory in autonomous mode originating from this calculation system. The curvatures $\gamma_{k+i}$ to be applied to the trajectory may for example relate to those of a deviation to be performed by the vehicle to avoid an obstacle or to change lane.

Thus, the control device of the invention can anticipate the announcement of a bend in the manner of a driver who is watching the road in front of the vehicle so as to commence a bend, change lane or direction, avoid an obstacle or any other thing, rather than guiding the vehicle as if it were on a rail.

Advantageously the distance x varies as a function of the current speed v of the vehicle. Purely by way of nonlimiting illustration, it is possible to envision the distances x equal to the product of the speed v multiplied by given response times having fixed values or having values which are themselves dependent on speed. These response times may likewise be parametrizable to make it possible to adjust them in the course of the vehicle trials.

The meta-vector $\Gamma_k = (\gamma_{k|i})_{i=1}^{N}$ generated by the calculation sub-module 9 is transmitted to a multiplication sub-module 10 for multiplying the meta-vector $\Gamma_k$ by the meta-matrix $\mathscr{F}$.

The anticipated curvatures of the lane constitute a succession of disturbances which are imposed by the environment of the vehicle or by any other event of an unintentional nature but which are predictable over the anticipation horizon considered. Other predictable disturbances can be taken into account by the device according to the invention. For example the sidewind communicated by a weather station or a dedicated sensor of the vehicle, in particular when traversing a viaduct crossing a valley. For example too an imbalance in tire pressure or the presence of black ice on the carriageway. Provision may thus be made for the device according to the invention to anticipate a succession of constant or variable disturbances over a given prediction horizon.

In the didactic embodiment illustrated by FIG. 2, the module 14 comprises a sub-module 18 whose output is added to the output of the sub-module 8 and to the output of the sub-module 10 with the aim of transmitting to the module 3 the meta-state vector or vector of state vectors which is given by formula 124 hereinbelow:

$$\Xi_{k+1} = \mathscr{A} \Xi_k + \mathscr{B} U_k + \mathscr{F} \Gamma_k$$

In formula 124, the meta-vector $U_k$ is ideally the vector of the N optimized commands $u_k$, $u_{k+i}$, i varying from 1 to N−1 such as they are calculated by the module 3 on the basis of the meta-state vector $\Xi_{k+1}$ transmitted by the module 14 to the module 3. In a sequential numerical processing, the meta-vector $U_k$ can be initialized to the meta-vector $U_{k-1}$ of the previous processing instant k−1. Doing this enables the optimization algorithm executed by the module 3 to converge faster.

The meta-vector $U_k$ of anticipation of commands has as optimal value that calculated by the module 3 on the basis of the states to anticipation meta-vector $\Xi_{k+1}$, in the manner now explained.

The module 3 hosts a first meta-cost function $\mathcal{J}_1$ given by formula 125 hereinbelow:

$$\mathcal{J}_1 = \Xi_{k+1}^T \mathcal{Q} \Xi_{k+1} + U_k^T \mathcal{R} U_k$$

in which the left-hand side of the meta-cost function $\mathcal{J}_1$ is a scalar value to be minimized, and the right-hand side is a sum of two quadratic-optimization terms. We recognize in the first term on the right-hand side the meta-vector $\Xi_{k+1}$ of anticipation of states to be minimized, so as to obtain anticipated states that are as close as possible to targeted states of zero value. We recognize in the second term on the right-hand side the meta-vector $U_k$ of anticipation of commands to be minimized, so as to obtain anticipated commands that are as small as possible to attain the targeted states of zero value.

The anticipated states weighting meta-matrix $\mathcal{Q}$ comprises n·N rows and n·N columns with diagonal coinciding with the diagonals of N elementary states weighting matrices $Q_{k+i-1}$, each comprising n rows and n columns, i varying from 1 to N. The diagonal of each elementary states weighting matrix $Q_{k+i-1}$ comprises a weighting coefficient for each elementary state. The higher the weighting coefficient associated with an elementary state, the more the elementary state is minimized in the quadratic optimization associated with the first term. Thus the higher the weighting coefficient, the more importance there is in minimizing the associated elementary state. A priori all the elementary states weighting matrices $Q_{k+i-1}$ are identical insofar as no reason exists to weight the elementary states of the successive states differently. However, as we shall now see in a preferred embodiment, it is beneficial for the last elementary states weighting matrix $Q_{k+N}$ to have different coefficients from the other matrices.

A first mechanism making it possible to ensure the stability of the dynamic system consists in parametrizing previously, in a study and trials phase, a matrix P of values different from those of the coefficients of the matrices $Q_{k+1}$ to $Q_{k+N-1}$, so that for the last state predicted at the horizon N:

$$Q_{k+N} = P$$

In order to ensure that beyond the horizon N, the cost function J is decreasing, stated otherwise that it will end up converging, common practice is to define an access cost to be a decreasing Lyapounov function in a comparable manner to those described in documents US2002/0193920 or U.S. Pat. No. 6,560,493.

For an LTI (Linear Time Invariant) system, the terminal weighting matrix P is chosen in such a way that the cost function J is equivalent to a cost of infinite horizon as is the case in LQR (Linear Quadratic Regulator) controllers. The matrix P is obtained by solving a Ricatti equation known for example from the documents cited in the previous paragraph.

In the present case of the invention, the dynamic system which varies as a function of the speed of the vehicle is of LPV (Linear Parameter Varying) type. The terminal cost weighting is then calculated by solving Linear Matrix Inequalities (LMIs) which have already been described elsewhere, for example in documents EP2855238B1, U.S. Pat. No. 9,535,422B2, or EP2855240B1.

The meta-matrix $\mathcal{R}$ of weighting of anticipated commands comprises N rows and N columns with diagonal coinciding with the diagonals of N elementary command weighting matrices $R_{k+i}$ each comprising 1 row and 1 column, i varying from 1 to N. The diagonal of each elementary command weighting matrix $R_{k+i}$ comprises a weighting coefficient for the anticipated command $u_{k+i}$. The higher the weighting coefficient associated with an elementary command, the more the command is minimized in the quadratic optimization associated with the second term. Thus the higher the weighting coefficient, the more importance there is in minimizing the associated elementary command. A priori all the elementary command weighting matrices $R_{k+i}$ are identical insofar as no reason exists to weight the elementary commands of the successive states differently.

Setting the values of the coefficients of the matrices $Q_{k+i-1}$ and $R_{k|i}$ in the phase of fine tuning by modeling or by on-track trials of the vehicle makes it possible to adjust the behavior of the controller module 3.

In formula 125, the optimization acts on the meta-vector of commands $U_k$, which constitutes the unknown of the equation or more exactly the quantity to be determined, the meta-vector of states, for its part, being given by formula 124 which makes it result from the commands, from the curvatures of the traffic lane and from the mechanical behavior of the vehicle. Replacing in formula 125 the meta-state vector $\Xi_{k+1}$ by its expression given in formula 124, we obtain formula 126:

$$J_1 = (\xi_k^T \mathcal{A}^T + U_k^T \mathcal{B}^T + \Gamma_k^T \mathcal{F}^T) \mathcal{Q} (\mathcal{A}\xi_k + \mathcal{B} U_k + \mathcal{F}\Gamma_k) + U_k^T \mathcal{R} U_k$$

Expanding formula 126, the first meta-cost function can be written in the form of a sum of four expressions:

$$J_1 = E_{xp1} + E_{xp2} + E_{xp3} + E_{xp4}$$

in which the first expression $E_{xp1}$ depends only on the estimation vector $\bar{\xi}_k$ for the current state, given by the module 2, the meta-vector $\Gamma_k$ of curvatures of the lane given by the module 9, and does not depend on the meta-vector of commands $U_k$ which alone constitutes the controllable optimization quantity:

$$E_{xp1} = \bar{\xi}_k^T \mathcal{A}^T \mathcal{Q} \mathcal{A} \bar{\xi}_k + \bar{\xi}_k^T \mathcal{A}^T \mathcal{Q} \mathcal{F} \Gamma_k + \Gamma_k^T \mathcal{F}^T \mathcal{Q} \mathcal{A} \bar{\xi}_k + \Gamma_k^T \mathcal{F}^T \mathcal{Q} \mathcal{F} \Gamma_k$$

The second expression $E_{xp2}$ depends only on the estimation vector $\bar{\xi}_k$ of the current state and the meta-vector of commands $U_k$ to order 1:

$$E_{xp2} = \bar{\xi}_k^T \mathcal{A}^T \mathcal{Q} \mathcal{B} U_k + U_k^T \mathcal{B}^T \mathcal{Q} \mathcal{A} \bar{\xi}_k = 2\bar{\xi}_k^T \mathcal{Q} \mathcal{B} U_k$$

The third expression $E_{xp3}$ depends only on the meta-vector $\Gamma_k$ of curvatures of the lane, and the meta-vector of commands $U_k$ to order 1:

$$E_{xp3} = U_k^T \mathcal{B}^T \mathcal{Q} \mathcal{F} \Gamma_k + \Gamma_k^T \mathcal{F}^T \mathcal{Q} \mathcal{B} U_k = 2\Gamma_k^T \mathcal{F}^T \mathcal{Q} \mathcal{B} U_k$$

The fourth expression $E_{xp4}$ depends only on the meta-vector of commands $U_k$ to order 2:

$$E_{xp4} = U_k^T \mathcal{B}^T \mathcal{Q} \mathcal{B} U_k + U_k^T \mathcal{R} U_k = U_k^T (\mathcal{B}^T \mathcal{Q} \mathcal{B} + \mathcal{R}) U_k$$

A dynamic quadratic optimization meta-matrix $\mathcal{H}$ is defined which makes it possible to rewrite the fourth expression $E_{xp4}$ with the following formula 127:

$$E_{xp4} = U_k^T (\mathcal{B}^T \mathcal{Q} \mathcal{B} + \mathcal{R}) U_k = U_k^T (\mathcal{H}) U_k$$

It is noted that the dynamic quadratic optimization meta-matrix $\mathcal{H} = \mathcal{B}^T \mathcal{Q} \mathcal{B} + \mathcal{R}$ involves through the meta-matrix $\mathcal{R}$ a hierarchization of the commands which is correlated through the meta-matrix $\mathcal{Q}$ with a hierarchization of the states. The coefficients of the dynamic quadratic optimization meta-matrix $\mathcal{H}$ are constants.

A dynamic cross-optimization meta-matrix $h$ is defined which makes it possible to rewrite the sum of the second $E_{xp2}$ and of the third $E_{xp3}$ expressions with the following formula 127:

$$E_{xp2} + E_{xp3} = 2(\bar{\xi}_k^T \mathcal{A}^T + \Gamma_k^T \mathcal{F}^T) \mathcal{Q} \mathcal{B} U_k = h U_k$$

It is noted that the dynamic cross-optimization meta-matrix $h = 2(\bar{\xi}_k^T \mathcal{A}^T + \Gamma_k^T \mathcal{F}^T) \mathcal{Q} \mathcal{B}$ involves in transposed form in its coefficients, the current state estimation vector $\bar{\xi}_k^T$ and the meta-vector of curvatures $\Gamma_k^T$ which are variable over time. It is recalled that the state estimation vector $\bar{\xi}_k^T$ at the current instant k may get replaced with the real state vector $\xi_k^T$ on vehicles in which the latter is accessible.

The first meta-cost function can then be rewritten in the following manner:

$$J_1 = E_{xp1} + U_k^T (\mathcal{H}) U_k + h U_k$$

As the first expression $E_{xp1}$ does not depend on the meta-vector $U_k$ which is the only variable on which it is possible to act to minimize the cost, it is possible to define a second meta-cost function $J_2$ through the following formula 128:

$$J_2(U_k) = U_k^T (\mathcal{H}) U_k + h U_k$$

It will be observed that the meta-cost functions $J_1$ and $J_2$ have the same extrema in conjunction with the meta-vector $U_k$.

The embodiment illustrated by FIG. 3 comprises here the same observer device 2 as that illustrated by FIG. 2. The person skilled in the art will readily understand that numerous other observer devices can be appropriate, both for the embodiment illustrated by FIG. 2 and for that illustrated by FIG. 3, provided that the observer device makes it possible to generate a current estimated state vector $\bar{\xi}_k$ at each instant k on the basis of a lateral control command $u_k$ applied to the vehicle at the same instant k when an estimation is necessary through lack of access to the real states at the current instant k.

In the preferred embodiment, illustrated by FIG. 3, the module 3 is replaced with a module 13 which optimizes the meta-vector $U_k$ of the anticipated commands by utilizing the second meta-cost function $J_2$ defined hereinabove by formula 128. With respect to the first cost function $J_1$ utilized by the module 3, the advantage of the second meta-cost function $J_2$ is that it now involves the meta-state vector only implicitly rather than explicitly.

The module 14 is replaced with a module 19 which comprises the same sub-module 8 and the same sub-module 10 to receive respectively the estimated state vector generated by the module 2 and the N anticipated curvatures of curves generated by the sub-module 9, but which no longer comprises the sub-module 18. A sub-module 16 receives the output of the sub-module 8 added to the output of the sub-module 10 to generate a value at the instant k of the dynamic cross-optimization meta-matrix $h$ or of its transpose by multiplying the sum ($\mathcal{A}\bar{\xi}_k + \mathcal{F}\Gamma_k$) by the matrix product $2\mathcal{B}^T\mathcal{Q}^T$ so as to allow the module 13 to obtain directly or indirectly the dynamic cross-optimization meta-matrix $h$ given by formula 129 hereinbelow:

$$h = [2\mathcal{B}^T\mathcal{Q}^T(\mathcal{A}\bar{\xi}_k + \mathcal{F}\Gamma_k)]^T = 2(\bar{\xi}_k^T\mathcal{A}^T + \Gamma_k^T\mathcal{F}^T)\mathcal{Q}\mathcal{B}$$

The advantage of the second embodiment is to clearly decouple, on the one hand the anticipation function carried out by the module 19 on the basis of knowledge of the curvatures of the lane at the locations where the vehicle is forecast to be situated at the N instants k+1, k+i, k+N following the current instant k, and on the basis of the current estimated state of the vehicle with respect to the lane, and on the other hand the pure optimization function carried out by the module 13.

The module 13 then uses the second meta-function to generate the optimal meta-vector of the commands by using one of the numerous known quadratic optimization algorithms, such as for example purely by way of nonlimiting illustration, the gradient method or Newton's method to solve the equation given by the following formula 130:

$$U_k^* = \underset{U_k}{\mathrm{argmin}}\, J_2(U_k) = \underset{U_k}{\mathrm{argmin}}[U_k^T \cdot H \cdot U_k + h \cdot U_k]$$

In each calculation cycle, only the command $u_k$, first component(s) of the meta-vector $U_k$ of rank k, is applied to the vehicle. The other components can be eliminated. They may, however, optionally be retained, for example to initialize the following calculation cycle so as to converge faster toward the optimal solution, or else to continue to operate over a limited number of calculation cycles posterior to the cycle in progress, so as to remedy a momentary loss of measurements or other information such as that providing the curvatures of the lane.

Figure 4:
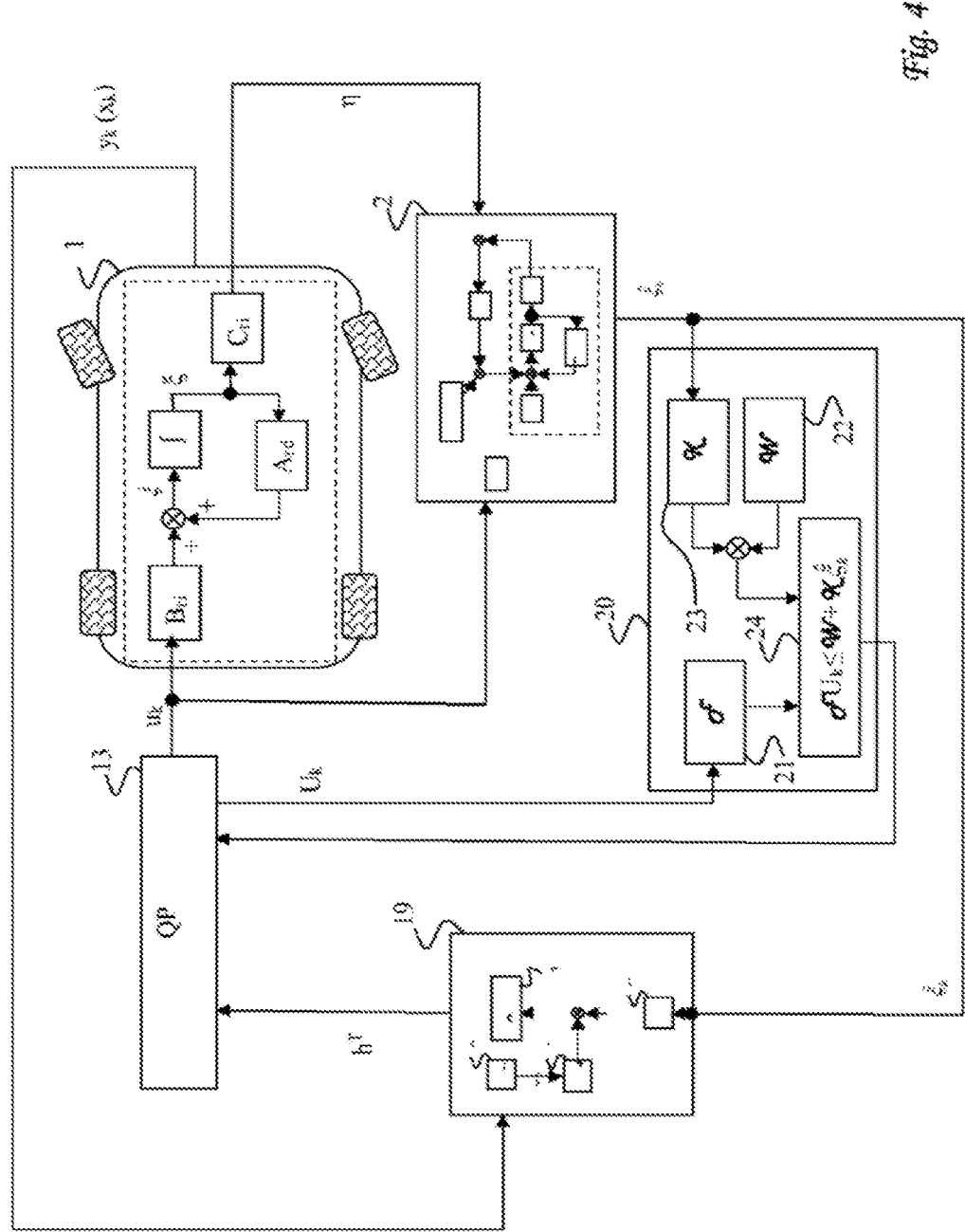
FIG. 4 is a diagram of third mode of implementation of the device in accordance with the invention.

FIG. 4 shows a module 20 receiving the meta-vector Uk to define the constraints of the system that the optimal solution must comply with. In this manner, the module 13 solves a constrained quadratic optimization problem.

Constraints on the admissible states $\xi$ of the system, on the feasible commands u and/or on the acceptable measurements $\eta$ can usefully be added. In this way, it is ensured that the calculated values of the current command and of the anticipated commands are optimal in a universe of possibles, both in terms of physical limits of the vehicle and of safety for the road traffic and more particularly for the passengers of the vehicle, or indeed for their comfort.

In a first case of constraints pertaining to the states of the system, one may want each elementary state, a component of the estimated state vector $\bar{\xi}_k$ or of the real state vector $\xi_k$, to be in a span of components of state vector $[\xi_{min}, \xi_{max}]$ which is given by a sub-module 22 of the module 20. If it is desired that these limits apply to all the successive states over the prediction horizon, the limits are retranscribed onto a meta-state vector $\Xi_{k+1}^{est}$, comprising the succession of the states given by the sub-module 4, i.e. by using formula 131 hereinbelow:

$$\Xi_{k+1}^{est} = \mathcal{A}\bar{\xi}_k + \mathcal{B}U_k$$

for the upper bound:

$$\mathcal{B}U_k \leq \begin{Bmatrix} \xi_{max} \\ \vdots \\ \xi_{max} \end{Bmatrix} - \mathcal{A}\hat{\xi}_k$$

for the lower bound:

$$\mathcal{B}U_k \geq \begin{Bmatrix} \xi_{min} \\ \vdots \\ \xi_{min} \end{Bmatrix} - \mathcal{A}\hat{\xi}_k$$

which can be written in the form of the following inequality:

$$\begin{bmatrix} B \\ -B \end{bmatrix} U_k \leq \begin{bmatrix} \begin{Bmatrix} \xi_{max} \\ \vdots \\ \xi_{max} \end{Bmatrix} \\ -\begin{Bmatrix} \xi_{min} \\ \vdots \\ \xi_{min} \end{Bmatrix} \end{bmatrix} + \begin{bmatrix} -A \\ A \end{bmatrix} \cdot \hat{\xi}_k$$

or else by putting for a limitation of the state values, the meta-matrices:

$$\mathcal{J}_\xi = \begin{bmatrix} \mathcal{B} \\ -\mathcal{B} \end{bmatrix};\; \mathcal{W}_\xi = \begin{bmatrix} \begin{Bmatrix} \xi_{max} \\ \vdots \\ \xi_{max} \end{Bmatrix} \\ -\begin{Bmatrix} \xi_{min} \\ \vdots \\ \xi_{min} \end{Bmatrix} \end{bmatrix} \text{ and } \mathcal{K}_\xi = \begin{bmatrix} -\mathcal{A} \\ \mathcal{A} \end{bmatrix}$$

A sub-module 21 receives in the module 20 the meta vector $U_k$ and employs the meta-matrix $\mathcal{B}$ to generate the left-hand side of the previous inequality.

A sub-module 23 receives in the module 20 the vector of estimated or real states, as the case may be, at the instant k and employs in real time the meta-matrix $\mathcal{A}$ to generate the right-hand side of the previous inequality in association with the sub-module 22.

The first case of constraints pertaining to the states of the system can be obtained by compelling the optimized value $U_k$ to satisfy formula 132 hereinbelow:

$$\mathcal{J}_\xi U_k \leq \mathcal{W}_\xi + \mathcal{K}_\xi \hat{\xi}_k$$

The inequality of formula 132 hereinabove is hosted in a sub-module 24 receiving the left-hand side defined by the unknown meta-vector Uk, and the right-hand side equal to the sum of the terms obtained by the sub-module 22 and the sub-module 23, to compel the left-hand side to be less than the right-hand side. Stated otherwise, the sub-module 21 makes it possible to verify that a variation of the current state and of the predicted states, which is correlated with the sought-after current command and with the commands predicted by the meta-matrix $\mathcal{J}_\xi$, is less than a distance which separates the current state and the predicted states from the admissible minimum and maximum states.

More generally, the meta-matrix $\mathcal{J}_\xi$ is included in a meta-matrix $\mathcal{J}$ of the sub-module 21, the meta-matrix $\mathcal{W}_\xi$ is included in a meta-matrix $\mathcal{W}$ of the sub-module 22, the meta-matrix $\mathcal{K}_\xi$ is included in a meta-matrix $\mathcal{K}$ of the sub-module 23. Thus, the inequality managed by the sub-module 24 may again be written in the form:

$$\mathcal{J} U_k \leq \mathcal{W} + \mathcal{K} \xi_k$$

In a second case of constraints pertaining to the commands of the system, one may want each elementary command, a component of the meta-vector $U_k$, to be in a span of components of command vector $[u_{min}, u_{max}]$.

One then puts for limitation of the command values, the meta-matrices:

$$\mathcal{J}_u = \begin{bmatrix} I \\ -I \end{bmatrix}; \mathcal{W}_u = \begin{bmatrix} \begin{Bmatrix} u_{max} \\ \vdots \\ u_{max} \end{Bmatrix} \\ -\begin{Bmatrix} u_{min} \\ \vdots \\ u_{min} \end{Bmatrix} \end{bmatrix} \text{ and } \mathcal{K}_u = [0]$$

to designate the zero matrix.

The second case of constraints pertaining to the commands of the system can be obtained by compelling the optimized value to satisfy formula 133 hereinbelow:

$$\mathcal{J}_u U_k \leq \mathcal{W}_u + \mathcal{K}_u \xi_k$$

It is possible to include the meta-matrices $\mathcal{J}_u$, $\mathcal{W}_u$, $\mathcal{K}_u$ respectively in the meta-matrices $\mathcal{J}$, $\mathcal{W}$, $\mathcal{K}$ with or without the meta-matrices $\mathcal{J}_\xi$, $\mathcal{W}_\xi$, $\mathcal{K}_\xi$ according to whether one does or does not want to satisfy at one and the same time the constraints on the commands and those on the states.

In a third case of constraints pertaining to the measurements of the system, one may want each elementary measurement, a component of the vector $\eta_k$, to be in a span of components of command vector $[\eta_{min}, \eta_{max}]$.

Then by putting for a limitation of the measurement values, the meta-matrices:

$$\mathcal{J}_\eta = \begin{bmatrix} \mathcal{C} \cdot \mathcal{B} \\ -\mathcal{C} \cdot \mathcal{B} \end{bmatrix}; \mathcal{W}_\eta = \begin{bmatrix} \begin{Bmatrix} \eta_{max} \\ \vdots \\ \eta_{max} \end{Bmatrix} \\ -\begin{Bmatrix} \eta_{min} \\ \vdots \\ \eta_{min} \end{Bmatrix} \end{bmatrix} \text{ and } \mathcal{K}_\eta = \begin{bmatrix} -\mathcal{C} \cdot \mathcal{A} \\ \mathcal{C} \cdot \mathcal{A} \end{bmatrix}$$

The third case of constraints pertaining to the measurements of the system can be obtained by compelling the optimized value to satisfy formula 134 hereinbelow:

$$\mathcal{J}_\eta U_{k+1} \leq \mathcal{W}_\eta + \mathcal{K}_\eta \xi_k$$

It is possible to include the meta-matrices $\mathcal{J}_\eta$, $\mathcal{W}_\eta$, $\mathcal{K}_\eta$ respectively in the meta-matrices $\mathcal{J}$, $\mathcal{W}$, $\mathcal{K}$ with or without the other meta-matrices previously mentioned according to whether one does or does not want to satisfy at one and the same time the constraints on the measurements and all or some of the other constraints.

In a fourth case of constraints pertaining to the stability and the feasibility of the predictive control of the model, one may want the last elementary state at the horizon, a component of the last vector of predicted states $\xi_{k+N}$, to converge inside a convex polytope $\Omega$ which is positive, invariant and robust.

$$\Omega = \{\xi \in \mathfrak{R}^n | F_\Omega \xi \leq g_\Omega\}$$

where $\mathfrak{R}^n$ designates the Cartesian product of the set $\mathfrak{R}$ of real numbers to dimension n corresponding to the amount of elementary states of the state vector.

The aim here is to ensure that the last predicted state vector $\xi_{k+N}$ is in a polytope $\Omega$ defined in a manner known per se (see for example WO201678715A1) to constitute a robust positive invariant set. In this way, the states converge asymptotically beyond the horizon when the last state predicted at the horizon N is in the polytope $\Omega$.

Unlike the prior art disclosed in document WO201678715A1 which verifies in the design phase whether solutions attain the polytope, the device of the invention seeks to compel in real time the solution to attain the polytope.

The functions $F_\Omega$ and $g_\Omega$ are defined both in terms of command and also curvature and speed beyond the horizon N, by using a scheme known per se such as for example that of the document mentioned hereinabove.

One then puts for example for a limitation of the measurement values, the meta-matrices:

$$\mathcal{J}_\eta = \begin{bmatrix} [0] \\ F_\Omega \cdot \mathcal{B} (\text{last } n \text{ elements}) \end{bmatrix}; W_\eta = \begin{bmatrix} [0] \\ g_\Omega \end{bmatrix} \text{ and }$$

$$K_\eta = \begin{bmatrix} [0] \\ F_\Omega \cdot A (\text{last } n \text{ elements}) \end{bmatrix}$$

The invention claimed is:

1. A control device for real-time control of trajectory of an autonomous vehicle, the control device comprising:
   processing circuitry configured to
      produce in real time on the basis of a real or estimated vector of states ($\xi_k$, $\hat{\xi}_k$) at each instant k of following of a lane by the vehicle moving at a current speed (v), a first turning command ($u_k$) to stabilize the trajectory of the vehicle with respect to said lane, and
      generate a quantity ($\Xi_{k+1}$,h) representative of a meta-vector ($\Gamma_k$) of disturbances for each predicted position of the vehicle at instants succeeding in a given amount (N) at a current instant (k) and of the vector of states ($\xi_k$, $\hat{\xi}_k$) at the current instant (k), wherein
   the processing circuitry is configured to produce the first turning command ($u_k$) by quadratic optimization of a relation between said representative quantity ($\Xi_{k+1}$,h) generated and a meta-vector ($U_k$) of successive turning commands for each predicted position of the vehicle at said instants succeeding in the given amount (N) at the current instant (k), and
   said representative quantity ($\Xi_{k+1}$,h) comprises, for each predicted position of the vehicle at said instants succeeding in the given amount (N) at the current instant (k), at least one product of the vector of states ($\xi_k$, $\hat{\xi}_k$) at the current instant (k) by a numerical matrix A(v) modeling a dynamic relation of the vehicle and raised to a power equal to a succession rank (i) of said predicted position.

2. The control device as claimed in claim 1, wherein said disturbances are curvatures of the lane for each predicted position of the vehicle.

3. The control device as claimed in claim 1, wherein said representative quantity ($\Xi_{k+1}$,h) comprises, for each predicted position of the vehicle at said instants succeeding in the given amount (N) at the current instant (k), at least one product of factors comprising a disturbance ($\gamma_{k+i}$) on the lane at the predicted position and the numerical matrix A(v) modeling the dynamic relation of the vehicle and raised to the power equal to the succession rank (i) of said predicted position.

4. The control device as claimed in claim 2, further comprising an apparatus combining properties of an optical camera and of a radar so as to provide at least one geometry of lateral deviation (y(x)) of director line of the lane in the form of a polynomial.

5. The control device as claimed in claim 4, wherein the processing circuitry is configured to calculate curvature ($\gamma_{k+i}$) on the basis of the geometry (y(x)) of median director line of the lane by formula:

$$\gamma_{k+i} = \frac{y''(x)}{(1+[y'(x)]^2)^{3/2}}.$$

6. The control device as claimed in claim 1, wherein a relation between said representative quantity ($\Xi_{k+1}$,h) generated and the meta-vector ($U_k$) of successive turning commands comprises, for each quadratic product of an anticipated state $\xi_{k+i}$, an elementary states weighting ($Q_{k+i}$) and an elementary command weighting matrix ($R_{k+i}$).

7. The control device as claimed in claim 6, wherein the elementary states weighting matrix ($Q_{k+N}$) for a last anticipated state ($\xi_{k+N}$) comprises coefficients which are associated with a decreasing positive function of a Lyapunov type, so as to favor a convergence of the optimization.

8. The control device as claimed in claim 1, wherein the processing circuitry is configured to compel all or some of elementary commands ($u_{k+i}$) of the meta-vector ($U_k$) of successive turning commands to comply with constraints of a type comprising at least one upper bound on the states, on the commands and/or on measurements.

9. The control device as claimed in claim 8, wherein the constraints comprise at least one lower bound on the states, on the commands and/or on the measurements.

10. The control device as claimed in claim 9, wherein the processing circuitry is configured to impose constraints on the elementary commands ($u_{k+i}$) of the meta-vector ($U_k$) of successive turning commands, so that a last state vector predicted ($\xi_{k+N}$) is in polytope ($\Omega$) which ensures asymptotic convergence beyond a prediction horizon (N).

11. The control device as claimed in claim 8, wherein the processing circuitry is configured to impose constraints on the elementary commands ($u_{k+i}$) of the meta-vector ($U_k$) of successive turning commands, so that a last state vector predicted ($\xi_{k+N}$) is in a polytope ($\Omega$) which ensures asymptotic convergence beyond a prediction horizon (N).

12. A method for real-time control of trajectory of an autonomous vehicle, the method comprising:
producing, by processing circuitry, in real time on the basis of a real or estimated vector of states ($\xi_k$, $\hat{\xi}_k$) at each instant k of following of a lane by the vehicle moving at a current speed (v), a first turning command ($u_k$) to stabilize the trajectory of the vehicle with respect to said lane; and
generating, by the processing circuitry, a quantity ($\Xi_{k+1}$,h) representative of a meta-vector ($\Gamma_k$) of disturbances for each predicted position of the vehicle at instants succeeding in a given amount (N) at a current instant (k) and of the vector of states ($\xi_k$, $\hat{\xi}_k$) at the current instant (k), wherein
the producing produces the first turning command ($u_k$) by quadratic optimization of a relation between said representative quantity ($\Xi_{k+1}$,h) generated and a meta-vector ($U_k$) of successive turning commands for each predicted position of the vehicle at said instants succeeding in the given amount (N) at the current instant (k), and
said representative quantity ($\Xi_{k+1}$,h) comprises, for each predicted position of the vehicle at said instants succeeding in the given amount (N) at the current instant (k), at least one product of the vector of states ($\xi_k$, $\hat{\xi}_k$) at the current instant (k) by a numerical matrix A(v) modeling a dynamic relation of the vehicle and raised to a power equal to a succession rank (i) of said predicted position.

13. A method or real-time control of trajectory of an autonomous vehicle, the method comprising:
producing, by processing circuitry, in real time on the basis of a real or estimated vector of states ($\xi_k$, $\hat{\xi}_k$) at each instant k of following of a lane by the vehicle moving at a current speed (v), a first turning command ($u_k$) to stabilize the trajectory of the vehicle with respect to said lane; and
generating, lav the processing circuitry, a quantity ($\Xi_{k+1}$, h) representative of a meta-vector ($\Gamma_k$) of disturbances for each predicted position of the vehicle at instants succeeding in a given amount (N) at a current instant (k) and of the vector of states ($\xi_k$, $\hat{\xi}_k$) at the current instant (k), wherein
the producing produces the first fuming command ($u_k$) by quadratic optimization of a relation between said representative quantity ($\Xi_{k+1}$,h) generated and a meta-vector ($U_k$) of successive turning commands for each predicted position of the vehicle at said instants succeeding in the given amount (N) at the current instant (k), and
said representative quantity ($\Xi_{k+1}$,h) comprises, for each predicted position of the vehicle at said instants succeeding in the given amount (N) at the current instant (k), at least one product of factors comprising a disturbance ($\gamma_{k+i}$) on the lane at the predicted position and a numerical matrix A(v) modeling a dynamic relation of the vehicle and raised to a power equal to a succession rank (i) of said predicted position.

\* \* \* \* \*